Oct. 25, 1932.  E. H. REMDE  1,884,863
MAGNETIC BRAKE
Original Filed July 4, 1924
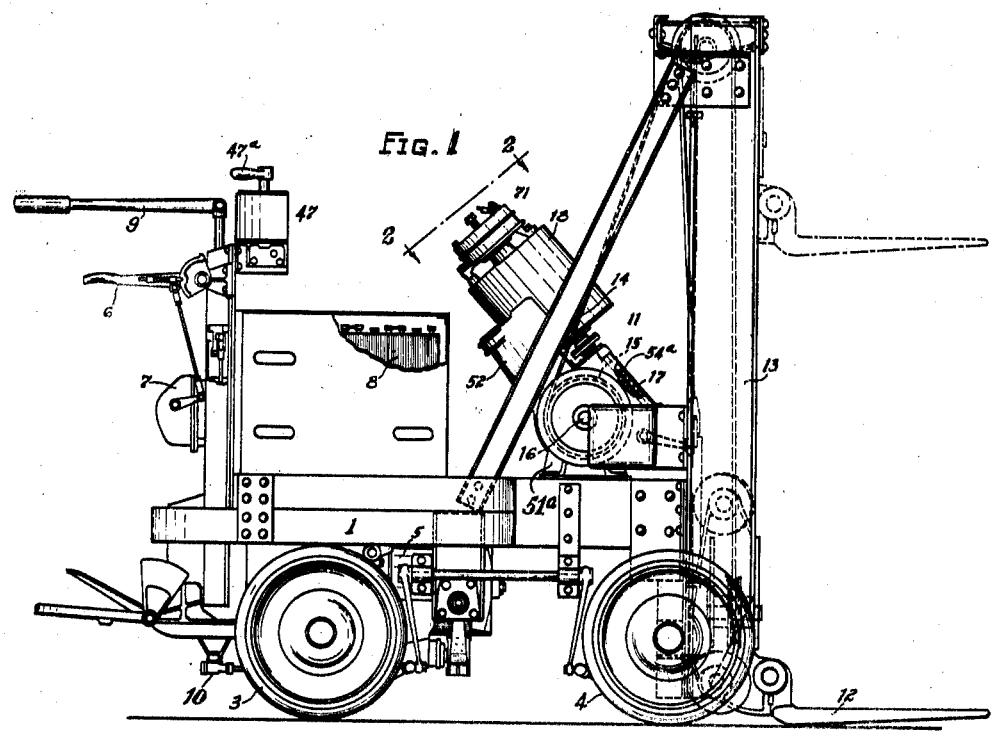
Fig. 1
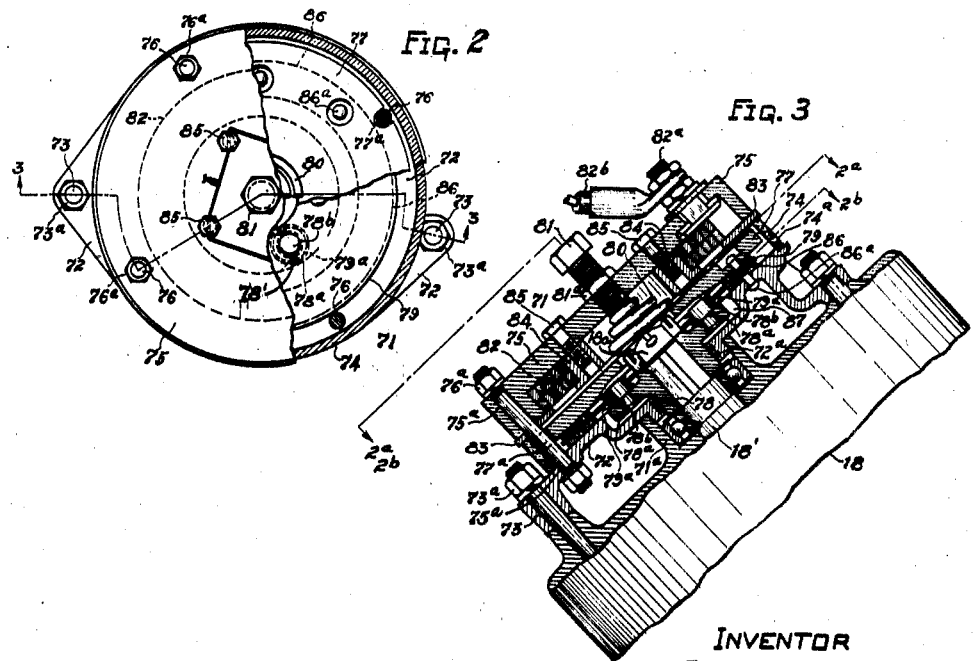
Fig. 2
Fig. 3
INVENTOR
EDWARD H. REMDE
BY
ATTORNEY Patented Oct. 25, 1932

1,884,863

UNITED STATES PATENT OFFICE

EDWARD H. REMDE, OF CLEVELAND, OHIO, ASSIGNOR TO THE BAKER-RAULANG COMPANY, OF CLEVELAND, OHIO, A CORPORATION OF OHIO

MAGNETIC BRAKE

Original application filed July 4, 1924, Serial No. 724,175. Divided and this application filed October 17, 1929. Serial No. 400,239.

This invention relates to a magnetic brake.

This application is a division of my original application Ser. No. 724,175, filed July 4, 1924.

One object of the invention is to provide an improved magnetic brake of simple construction.

Another object of the invention is to provide an improved magnetic brake so constructed that it may be combined with a motor in a ready manner.

Other objects of the invention will be apparent to those skilled in the art to which my invention relates from the following description taken in connection with the accompanying drawing, wherein Fig. 1 is a side view of an industrial truck for handling loads and a motor and magnetic brake therefor embodying my invention.

Fig. 2 is a view on the line 2—2 of Fig. 1, but partly in section on the lines 2a—2a and 2b—2b of Fig. 3.

Fig. 3 is a section on the line 3—3 of Fig. 2.

In the drawing, 1 indicates a frame mounted on pairs of wheels 3, 4; both pairs by preference being steerable. The wheels 3 may be driven by a motor 5. 6 indicates a handle for operating a controller 7 which controls the supply of current from suitable batteries 8 to the motor 5 to drive it in either direction and at the desired speeds. 9 indicates a handle, which operates through connections 10 to steer the pairs of wheels about a common center.

11 indicates as an entirety a load handling mechanism which in the illustrated construction comprises a raising and lowering member 12, slidable on suitable guides 13. The member is raised and lowered on the guides 13 by a cable 14, which winds on and off a drum 15, fixed to a shaft 16. The drum shaft 16 is rotated through a power mechanism 17 by an electric motor 18, such mechanism including a worm 54a connected to the motor shaft 18'. 51a indicates standards mounted on the frame 1 and supporting a cradle 52 for the motor 18 and a housing (preferably formed integral with the cradle) for the power mechanism 17. The motor 18 receives current from the batteries 8, the supply of current being controlled by a controller 47 suitably mounted on the truck frame, and the controller being operated by a handle 47a.

71 indicates as an entirety a brake mechanism for stopping the shaft 18' of the motor 18 and preventing movement thereof when the current to the latter is cut off. Of this mechanism, 71a indicates a collar extending from the upper end of the motor casing and provided on its inner wall with screw threads. 72 indicates an annular member having an inwardly extending ring 72a provided with screw threads to engage the screw threads on the collar 71a near its outer edge. The annular member 72 and an integral depending wall thereof are formed with openings to receive bolt shanks 73 extending from the motor casing, such shanks being screw threaded on their outer ends to take nuts 73a, whereby the annular member is rigidly clamped to the motor casing.

74 indicates a ring seated in an annular groove 74a formed in the face of the annular member 72 near its outer edge and serving as a spacing element between the annular member and a casing member 75. The annular member 72 and casing member 75 are formed with pairs of aligned openings 75a (one pair being shown in Fig. 3) to receive bolts 76 carrying nuts 76a, which—when tightened—clamp the casing member 75 to the annular member 72 with the ring 74 between them. 77 indicates a disk or plate, (preferably formed from iron or steel for a reason which will presently appear) disposed between the annular member 72 and casing member 75 and movable toward and from said members. The central portion of the plate is cut-away to receive the adjacent free end of the armature shaft 18' and the nut 18a thereon to which reference will later be made. The disk 77 is made of a size and shape to extend radially a distance greater than the distance from the axis of the motor to the securing bolts 76, so that by forming notches 77a in the edge of the disk, the bolts will serve as guides for the disk and prevent it from rotating with the armature shaft 18'. 78 indicates a collar keyed to the extended end of the armature shaft 18' and having a flange 78a carrying a plurality of pins 78b. 79 indicates a relatively thin annular plate having openings to receive the pins 78b to connect the plate to the flange 78a to cause it to rotate therewith. The openings in the plate 79 are of a size to permit the plate to move upwardly and downwardly on the pins, which serve as guides therefor, removable devices 78' projecting from the pins to prevent the displacement of the plate. 79a indicates coiled springs surrounding the pins 78b and disposed between the plate 79 and flange 78a. The springs are arranged to support the plate substantially midway between the flange and the free ends of the pins so that it may move thereon upwardly and downwardly, the springs tending to return the plate to this position if moved downwardly. 80 indicates a spring, preferably of the coiled type, interposed between the casing member 75 and the plate 77 and normally tending to move the latter toward the annular member 72—that is downwardly—to engage the rotating plate 79 and to press the latter against the annular member 72, thereby causing friction between the rotating disk and the stationary faces of the plate 77 and annular member 72 to prevent rotation of the armature shaft 18' or to stop the rotation thereof upon cutting off the current to the motor as will be later set forth. The outer end of the spring 80 is preferably engaged by the inner end of a cap screw 81, which is mounted in a screw threaded opening formed in the casing member 75, such cap screw being rotatable, so as to adjust its inner end toward and from the spring 80, whereby the tension of the latter may be increased or decreased as desired. The cap screw 81 may be locked in its adjusted position by a nut 81a. 82 indicates one or more windings mounted within the casing member 75 and adapted to be connected in the motor circuit in series with the motor when the latter is being driven in either direction, such connection being effected by terminals, one of which is shown at 82a connected to a lead 82b, forming one of the leads for the motor circuit. As shown, the windings 82 are disposed above the plate 77 and when the circuit to the motor is completed, the windings are energized and attract the plate 77, which constitutes an armature, and causes it to move upwardly against the tension of the spring 80 to release the plate from the rotating disk 79 and permit its disengagement from the annular member 72.

From the foregoing description it will be seen that I have provided a brake which is normally applied to the motor shaft to prevent its rotation and have associated therewith an electro-magnet that is connected in series with the motor circuit and operates automatically to release the brake when the motor is started and to permit the application of the brake when the current is cut off, so that the motor can not continue to run, due to momentum after the circuit is open.

The windings 82 are preferably supported in the casing member 75 by a pair of ring shaped members 83, 84, the former being clamped between the ring 74 and the sidewall of the casing member 75, and the latter being secured to the body portion of the casing member by cap screws 85 extending through screw threaded openings formed therein. As shown in Fig. 3 the annular or ring shaped members 83, 84, engage the inner faces of the windings and support them within the casing member 75. By constructing the annular members 83 and 84 to engage the inner face of the windings 82, I provide an air gap between the windings and the armature 77. To increase the friction between the opposite faces of the rotating plate 79 and opposing faces of the armature 77 and annular member 72, these latter faces may be provided with annular bands 86 of suitable material and secured thereto in any suitable manner, for example, by rivets 86a.

It will also be seen from the foregoing description that the rotating friction plate 79 is normally positioned in engagement with the annular member 72, so that upon the operation of the electro magnet, the disengagement of the plate from both opposing relatively stationary elements will be immediately effected.

To accommodate the collar 78 and flange 78a, the armature shaft 18' is extended and provided at its free end with screw threads to take the nut 18a which serves to maintain the collar 78 on the armature shaft, and the annular member 72 is formed with a recess 87 to receive the flange 78a.

The windings 82 being connected in series with the motor 18, it will be seen that upon the supply of current to the motor, the energized windings will attract the armature 77 and move it against the tension of the spring 80, thereby permitting the plate 79 to disengage the member 72 under the influence of the springs 79a and relieving its frictional engagement with the armature; thus, the motor shaft will be free to rotate. Upon cutting out of the current supply, the windings 82, are de-energized; this permits the spring 80 to act on the armature and move it inwardly toward the member 72, the effect of which is to clamp the plate 79 between the member 72 and armature 77, thereby causing a braking action to stop the motor shaft.

From the foregoing description it will be noted that the brake is mounted on the end wall of the motor casing. This form of construction insures a relatively simple form of braking means and one that requires but little space; it also eliminates the provision of room at one side of the motor and permits it to be mounted upon a support or cradle and in close relation to the power mechanism to be driven.

To those skilled in the art to which my invention relates, many changes in construction and widely differing embodiments and applications thereof will suggest themselves without departing from the spirit and scope of the invention. My disclosures and the description herein are purely illustrative and are not intended to be in any sense limiting.

What I claim is:

1. In apparatus of the class described, the combination with an electric motor, of an annular member fixed to the motor casing in concentric relation to the shaft of said motor, a casing member supported in fixed relation to the motor casing, a disk connected to the motor shaft but mounted to move axially thereof into and out of engagement with said annular member, an armature supported non-rotatively between said disk and said casing member and movable toward said annular member to effect frictional engagement of said disk with said armature and said annular member, means normally acting on said armature to move it toward said annular member to cause said disk to frictionally engage the armature and annular member, a winding connected in series with said motor and arranged to effect movement of the armature in the opposite direction when current is supplied to said motor, and means normally tending to move said disk away from said annular member.

2. In apparatus of the class described, the combination with an electric motor, of a collar fixed to the shaft of the motor and having a flange, a plurality of pins carried by said flange and extending in a direction parallel to the axis of the motor shaft, an annular plate fixed to the motor casing concentric to the motor shaft, a coil connected in series with the motor circuit, means for supporting said coil, an armature in operative relation to said coil, a disk between said annular plate and said armature slidably mounted on said pins, means between said plate and disk normally tending to move said disk away from said plate, and means engaging said armature and normally tending to move it toward said disk and to move the latter toward said plate.

In testimony whereof, I have hereunto subscribed my name.

EDWARD H. REMDE.